(No Model.)

I. Q. GURNEE.
SYRINGE.

No. 543,829. Patented July 30, 1895.

Witnesses:
Albert B. Blackwood.
Jos. H. Blackwood

Inventor.
Isaac Q. Gurnee
by Fuelon D. Brock
Attorney.

UNITED STATES PATENT OFFICE.

ISAAC Q. GURNEE, OF BUTLER, NEW JERSEY, ASSIGNOR TO THE BUTLER HARD RUBBER COMPANY, OF NEW YORK, N. Y.

SYRINGE.

SPECIFICATION forming part of Letters Patent No. 543,829, dated July 30, 1895.

Application filed May 31, 1895. Serial No. 551,247. (No model.)

*To all whom it may concern:*

Be it known that I, ISAAC Q. GURNEE, a citizen of the United States, residing at Butler, in the county of Morris and State of New Jersey, have invented certain new and useful Improvements in Syringes; and I do declare the following to be a full, clear, and exact description of the invention, such as will enable others skilled in the art to which it appertains to make and use the same, reference being had to the letters of reference marked on the accompanying drawings, which form a part of this specification.

My present invention relates to syringes.

The object of my improvements, more particularly stated, is to provide a piston-rod for syringes which shall have all the advantages inherent to hard rubber and none of its disadvantages.

For these purposes my invention consists in the following construction and combination of a piston-rod in a syringe, the details of which will first be fully set forth and the patentable features then described and claimed.

Figure 1:
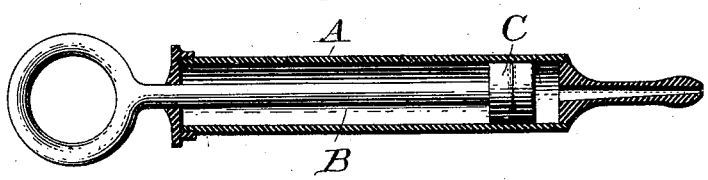
Figure 2:
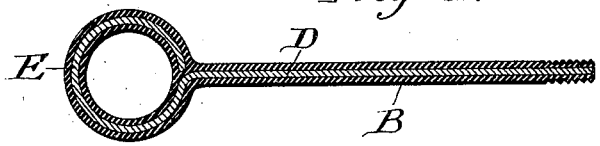

Figure 1 represents a central vertical section of a syringe, with a piston-rod and piston shown in elevation. Fig. 2 is a central vertical section of the piston-rod.

In the drawings, A represents the barrel of a syringe provided with the usual tip and cap.

B is the piston-rod, and C the piston. The piston-rod is provided with a metal core D, traversing centrally the entire length of the rod, and at the outer end the metal rod or wire is bent into an eye or ring E. The whole of the piston-rod, including the eye, is enveloped with a hard-rubber coating, which is vulcanized upon the metal core D. As a result of this construction I am enabled to produce a strong and rigid piston-rod, which, if made entirely of hard rubber, is liable to break—an accident of not infrequent occurrence.

By vulcanizing and enveloping the whole of the eye or ring E a rigid handle for the piston-rod is produced—a construction not possible where hard rubber is used alone, or where a metal wire rod is used having its outer end bent into the form of an eye.

Hard rubber is a product peculiarly adapted for piston-rods of syringes, because of the employment in syringes of a variety of fluids and chemicals and the well-known resistance of hard rubber to any deleterious action of such fluids. The hard rubber vulcanized thereon covers not only the rod itself, but both ends of the rod, and forms in one homogeneous whole both the handle and the thread upon which the piston is seated, thus insulating and effectually preventing any access of the corrosive action of the fluid upon the metal core—an essential requisite in a syringe piston-rod.

I claim—

In a syringe, the combination of a syringe barrel, having a tip at one end and a head at the other, a piston sliding in said barrel, and a piston rod sliding in said head and connected to said piston, said piston rod having a metal core and provided with a coating of hard rubber vulcanized thereon.

In testimony whereof I affix my signature this 23d day of May, 1895.

ISAAC Q. GURNEE.

Witnesses:
WILLIAM KIEL,
JOS. F. McLEAN.